(12) United States Patent
Zatsorenko

(10) Patent No.: US 11,938,908 B2
(45) Date of Patent: Mar. 26, 2024

(54) AUTOMOTIVE WINDOW REGULATOR SLIDE BLOCK REPAIR KIT AND METHOD OF USING THE SAME

(71) Applicant: Alexander Zatsorenko, Bensenville,, IL (US)

(72) Inventor: Alexander Zatsorenko, Bensenville,, IL (US)

( * ) Notice: Subject to any disclaimer, the term of this patent is extended or adjusted under 35 U.S.C. 154(b) by 321 days.

(21) Appl. No.: 17/248,306

(22) Filed: Jan. 19, 2021

(65) Prior Publication Data

US 2022/0227334 A1 Jul. 21, 2022

(51) Int. Cl.
*B60S 5/00* (2006.01)
*B23P 6/00* (2006.01)

(52) U.S. Cl.
CPC .. *B60S 5/00* (2013.01); *B23P 6/00* (2013.01)

(58) Field of Classification Search
CPC ..................................... B60S 5/00; B23P 6/00
See application file for complete search history.

(56) References Cited

U.S. PATENT DOCUMENTS

| | | | | |
|---|---|---|---|---|
| 4,442,632 A * | 4/1984 | Greco | ................... | E05F 11/485 49/352 |
| 4,920,697 A * | 5/1990 | Vail | ....................... | E05F 11/488 49/352 |
| 5,099,611 A * | 3/1992 | Kracht | ...................... | B60J 1/17 49/374 |
| 6,499,185 B1 * | 12/2002 | Moyer | ..................... | E05F 3/222 16/51 |
| 6,892,496 B1 * | 5/2005 | Youngs | ................... | B60J 5/0416 49/502 |
| 7,983,790 B2 * | 7/2011 | Crothers | .................... | B23P 6/00 901/41 |
| 8,215,060 B2 * | 7/2012 | Sasaki | .................... | E05F 11/382 49/352 |
| 8,402,633 B2 * | 3/2013 | Wang | ......................... | B21J 15/50 29/524.1 |
| 9,126,291 B1 * | 9/2015 | Thrasher | .................... | B23P 6/00 |
| 2002/0166220 A1 * | 11/2002 | Imundo | ..................... | B64F 5/40 29/402.09 |
| 2005/0081354 A1 * | 4/2005 | Motzno | ..................... | B21J 15/10 29/402.09 |
| 2019/0106922 A1 * | 4/2019 | Woodall | .................... | E05F 5/003 |
| 2019/0250600 A1 * | 8/2019 | Hayashi | .................... | B60S 5/00 |
| 2022/0234297 A1 * | 7/2022 | Lavazza | ..................... | E04B 1/00 |

* cited by examiner

*Primary Examiner* — Christopher J Besler
(74) *Attorney, Agent, or Firm* — Chen-Chi Lin

(57) ABSTRACT

The preferred embodiment of the present invention includes method for replacement of the slide block of a single arm automotive window lift regulator that was damaged due to normal wear-and-tear on the window regulator, or from stress placed on the slide block of the window regulator at the point where the slide block is attached to the window regulator arm. The invention applies to the window regulators installed in the w901, 902 and 903 series Mercedes Benz Sprinter and Dodge Sprinter vans, built between 1995 and 2006, Mercedes Benz Sprinter vans built between 1995-2002, Dodge Sprinter vans 2500, 3500 built between 2002 and 2006, Freightliner Sprinter vans 2500, 3500 built between 2002 and 2006. The method of the present invention provides a service kit that contains a replacement slide block of a different design and material, replacement mounting bolt of a specific design and a locking nut.

19 Claims, 4 Drawing Sheets

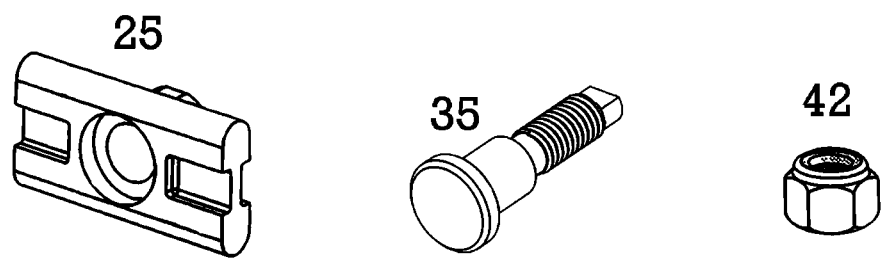
FIGIRE 7
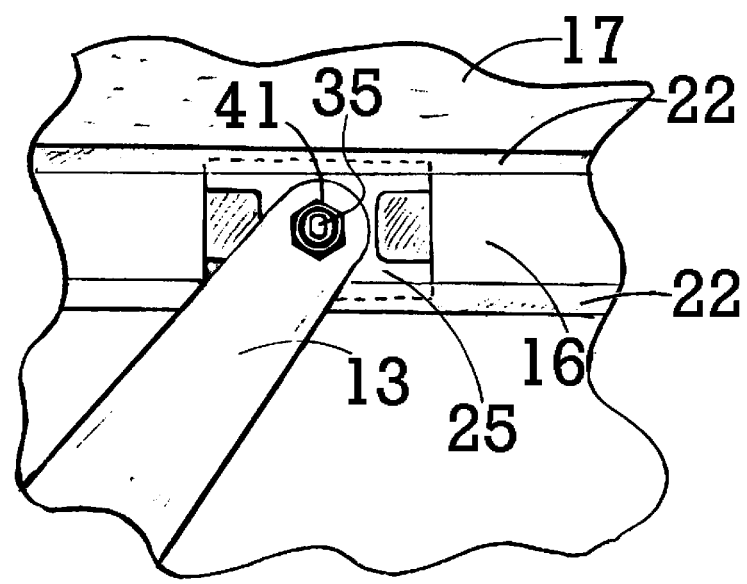
FIGURE 8

AUTOMOTIVE WINDOW REGULATOR SLIDE BLOCK REPAIR KIT AND METHOD OF USING THE SAME

FIELD OF THE INVENTION

The present invention relates to the window regulator slide block kit for servicing and repairing of an electrically or manually operated window lift regulators and the method for using same. More particularly, it relates to the parts required to servicing and repairing of the window regulators found on 901, 902 and 903 series Mercedes Benz Sprinter and Dodge Sprinter vans, built between 1995 and 2006, Mercedes Benz Sprinter vans built between 1995-2002, Dodge Sprinter vans 2500, 3500 built between 2002 and 2006, Freightliner Sprinter vans 2500, 3500 built between 2002 and 2006 without removing window regulator from the door structure of the vehicle .

BACKGROUND OF THE INVENTION

Conventional electrically operated windows are systems designed to raise and lower the vehicles windows via devise called an electric window regulator. Typically, there is an electric window regulator for each door with an associated switch. Often, the driver's door has a set of switches that allows the driver to operate the power windows in both front doors. Manually operated window regulators are also used, and the task of lowering and raising of the window is accomplished by rotating the corresponding window regulator crank handle. Thus, it is generally a requirement that the raising and lowering mechanisms of the window regulators are installer inside of the in the door structure as well.

In a traditional single arm power window regulator, the window's lifting mechanism consists of a linkage designed to lift the window while at the same time keeping the window horizontally leveled.

An electric motor is attached to a worm gear, a spur gear, and the segment gear of the linkage arm to create gear reduction sufficient to generate enough torque to move the window. The window regulator is attached by rivets or bolted to the door frame structure. Window regulators linkage arm is fitted with plastic slide block that is riveted to it at one end. Slide block is inserted into a slide block guide channel that is connected to the bottom of the window glass during the door assembly process.

The radial movement of the window regulators arm transfers into vertical movement of the door window glass through the slide block that moves within and along the length of the slide guide channel at the bottom of the window glass.

The electric motor of the window regulator is connected to a reversable switch. Activating the electric switch causes supply of the current that causes the motor to rotate the worm gear. Reversing the current flow causes the electric motor to rotate in opposite directions. The worm gear is meshed with the spur gears. When the worm gear rotates, the spur gears turn in conjunction with the worm gear.

The linkage arm has a segment gear at one end with teeth that are meshed with the spur gear. Thus, the segment gear of the linkage is permanently in mechanical contact with the worm gear. This prevents the linkage arm from the movement and allows the movement when the electric motor is activated. The linkage arm is attached to the swivels point pin that of the window regulator motor bracket. Position of the pin provides constant contact of the segmented gear of the linkage.

When the spur gear turns, its teeth engage and disengage with successive linkage segmented gear teeth. This causing the end of the segment gear to move depending upon the direction of rotation of the spur gear. As the segmented end of the linkage moves, the linkage rotates about the pin and the linkage arm end with the slide block moves in opposition to the geared end. Because the linkage arm end is disposed in the window slide guide via slide block, the movement of the linkage arm causes the end to move along the groove of the slide guide and the window to raise or lower.

When the window goes up or down, the drive motor and regulator work in sync always.

Through the course of the vehicle use, the components of the window regulator mechanisms begin working with greater effort that originally designed due to its age, and sometimes the lack of maintenance is a well-known contributing factor. Often it can be because the surfaces of the door window glass rubberized insulation gaskets drying out and having increased coefficients of friction.

At times, the window class become stuck or harder to move, due in part to a variety of factors such as ice buildup, and exposure to dust, dirt. This can cause the window regulator failure.

It is a common failure of the window regulator, when slide guide block that is made of the plastic material becomes shattered, causing window regulator arm to disengage from the slide guide channel at the bottom of the window glass, and window drop inside of the door frame.

As a part of the repair procedure, the damaged component should be replaced with a new part. However, due to the original design of the window regulator, since the plastic slide block is permanently attached by a rivet to the arm, the replacement part only available from the supplier in the form of complete window regulator assembly.

Since the window regulator is located within the door the structure, the repair procedure calls for removal of the entire window regulator assembly form the door and replacing it with the new one.

Being able to replace only the commonly damaged plastic slide block of the window regulator with an upgraded and re-designed part and being able to conduct the repairs without removing the entire assembly from the vehicle would make the repair much easier and more economical.

Thus, there is a need for a service kit for the window regulator repair, further, it is advantageous for this to be done without removing the window regulator from the vehicle to conduct the repair.

For all the above reasons, there is a need for a method for inexpensively repairing of the window regulator that allows the user to replace only the damaged slide block, leaving the original window regulator in place. The replacement slide block can use stronger materials than the original slide block, be configured with the same or a different design. The present invention attempts to satisfy these needs.

SUMMARY OF THE INVENTION

The present invention is a method for replacing of the damaged slide block of a window regulator used for operating of the door windows in the w 901, 902 and 903 series Mercedes Benz Sprinter and Dodge Sprinter vans, built between 1995 and 2006, Mercedes Benz Sprinter vans built between 1995-2002, Dodge Sprinter vans 2500, 3500 built between 2002 and 2006, Freightliner Sprinter vans 2500, 3500 built between 2002 and 2006 without removing the window regulator from the vehicle.

Often, the plastic slide block of the window regulator on these vehicles, which has the primary purpose of providing a sliding joint between the lifting arm of a window regulator and the slide guide channel of the window glass, becomes damaged over time due to the stress placed on slide block. The user must then take the vehicle to a dealer, independent repair facility, or do the work himself and have the window regulator slide block replaced, which includes replacement of the entire window regulator assembly, at a significant cost.

Instead of absorbing the cost of replacing of the entire window regulator assembly, because of a damaged slide block, the present invention provides for the replacement of the slide block kit, leaving the window regulator assembly in place, without removing the window regulator assembly from the door of the vehicle. In doing so, the replacement slide block for a window regulator will be made from a stronger material to reduce the chance of further damage. Also, the replacement slide block for window regulator can be made in the form of a repair kit that will include mounting hardware for the installation.

It is an objective of the present invention to provide a replacement slide block of a window regulator for a door window in a 901, 902 and 903 series Mercedes Benz Sprinter and Dodge Sprinter vans, built between 1995 and 2006, Mercedes Benz Sprinter vans built between 1995-2002, Dodge Sprinter vans 2500, 3500 built between 2002 and 2006, Freightliner Sprinter vans 2500, 3500 built between 2002 and 2006.

It is another objective of the present invention to provide a replacement slide block of a window regulator for a door window in a w 901, 902 and 903 series Mercedes Benz Sprinter and Dodge Sprinter vans, built between 1995 and 2006, Mercedes Benz Sprinter vans built between 1995-2002, Dodge Sprinter vans 2500, 3500 built between 2002 and 2006, Freightliner Sprinter vans 2500, 3500 built between 2002 and 2006 of the similar design that was damaged due to wear-and-tear or from stress placed on the point where the slide block is attached to the window regulator arm where the slide block is connected to the slide block guide.

It is another objective of the present invention to provide for the replacement slide block of the window regulator and the attachment kit for a damaged slide block using a different type of the material than the original.

It is another objective of the present invention to provide for the replacement of a damaged slide block of the window regulator using a differently designed mounting hardware than the original.

It is another objective of the present invention to provide for the replacement of a damaged slide block of the window regulator and all of the mounting hardware necessary for repair of an existing original window regulator.

While the invention is described herein with relation to certain embodiments and applications, those with skill in this art will recognize changes, modifications, alterations and the like which still come within the spirit of the inventive concept, and such are intended to be included within the scope of the invention, as expressed in the drawings, description and claims disclosed herein.

DESCRIPTIONS OF THE FIGURES

The invention can be better understood by relating the following detailed description of certain preferred embodiments, reference is being made to the accompanying drawings in which:

FIG. 7 is a picture of a perspective view of the slide block kit that includes replacement slide block, mounting bolt, and the locking nut for a window regulator prior to installation according to one embodiment of the present invention.

FIG. 8 is a picture of a front plain partial view of the slide block kit that includes replacement slide block, mounting bolt, and the locking nut for a window regulator after the installation according to one embodiment of the present invention.

DETAILED DESCRIPTION

The present invention is a method for replacing the damaged slide block of a window regulator used for lowering and raising the door windows in a w 901, 902 and 903 series Mercedes Benz Sprinter and Dodge Sprinter vans, built between 1995 and 2006, Mercedes Benz Sprinter vans built between 1995-2002, Dodge Sprinter vans 2500, 3500 built between 2002 and 2006, Freightliner Sprinter vans 2500, 3500 built between 2002 and 2006.

The method of the present invention provides for a replacement slide block of a window regulator assembly that may have been damaged due to wear-and-tear from daily use or broken when some other accidental condition occurred. In the preferred embodiment of the present invention, the window regulator mechanism of the window regulator has not been damaged, only the slide block of a window regulator device has been damaged.

The method of the present invention includes removing of the damaged portion of the slide block and its mounting hardware from the window regulator assembly without removing the window regulator from the vehicle and installing a replacement slide block kit that will allow for the same or improved functionality as the original slide block. That functionality may include lowering and raising the window of the vehicle and providing security by preventing window from uncontrolled down movement, among other functionalities.

Additionally, the present invention provides for the replacement of the slide block of a window regulator that was damaged with a slide block kit that is made from stronger material. In an alternative embodiment, the method of the present invention provides for the replacement of a damaged slide block and mounting hardware necessary for the window regulator functionality described herein.

Figure 1:
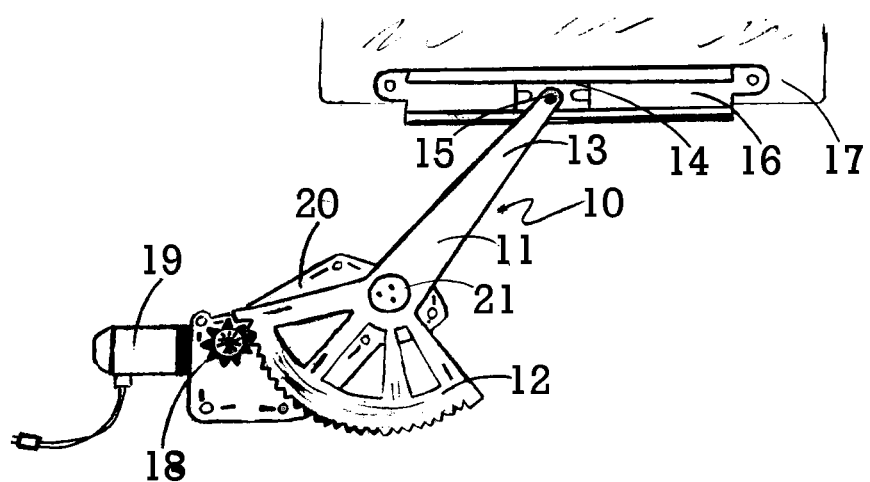
FIG. 1 is a picture of a front plain view of single arm window regulator assembly according with the prior art.

FIG. 1 illustrates front plain view of single arm window regulator assembly 10, as understood by one having ordinary skill in the art. The single arm window regulator assemblies are usually made throughout of stamped steel for strength and is configured with a regulator arm 11, segmented gear section 12, and a linkage arm section 13. The slide block 14 is mounted on a steel shaft to provide a swivel point (not shown) and permanently attached by the rivet 15 at the end of the linkage arm section 13. The slide block 14 of the window regulator 10 is further engaged with the slide guide rail track 16 of the window glass assembly 17. The window regulator assembly 10 also fitted with a spur gear 18 and electric motor 19 with a worm gear (not shown) and attached to the motor bracket 20. Linkage arm 11 is also attached to the motor bracket 20 at the swivel point 21.

Most vehicles today are fitted with electrically or manually operated window regulators. Since the door window regulator continued to be necessary to lower or rase the window, the w 901, 902 and 903 series Mercedes Benz Sprinter and Dodge Sprinter vans, built between 1995 and 2006, Mercedes Benz Sprinter vans built between 1995-2002, Dodge Sprinter vans 2500, 3500 built between 2002 and 2006, Freightliner Sprinter vans 2500, 3500 built between 2002 and 2006 were fitted with a single arm window regulator.

During the production and the assembly of the window regulators for the forementioned series vehicles, —stamped steel and injection molded plastic parts were utilized. One of the injection-molded plastic components is incorporated into a window regulator assembly, is a slide guide block 14 of the drawing.

This part is designed to create a contact point between the door window regulator and the window glass assembly. While permanently attached to the end of the window regulator assembly arm, slide block 14 is designated to move along the length of the slide guide rail track 16 at the bottom of a window glass 17 during the operation. Incorporated into a stamped steel construction of the window regulator 10, a plastic slide block component 14, can be viewed as a vulnerable part. In many cases the plastic slide block 14, became damaged, causing a failure of the assembly 10.

Figure 2:
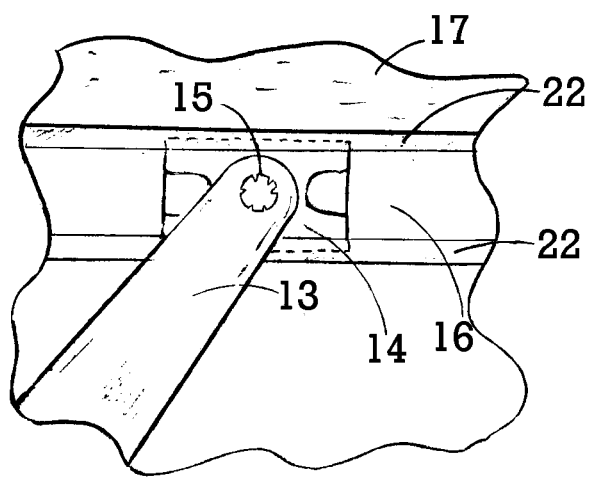
FIG. 2 is a picture of a front plain partial view of window regulator with the linkage arm with the slide block according with the prior art.

FIG. 2 illustrates front plain partial view of window regulator 10, containing linkage arm section 13, slide block 14, slide block mounting pin rivet head 15, and the slide block guide rail 16. In this illustration, the slide block 14, is permanently attached to the linkage arm section 13 of the window regulator assembly 10. Further the configuration of the mounting pin with the rivet head 15 includes the shaft portion (not visible), that allows the slide block 14 to rotate about its axis. The slide block 14 is inserted into a guide rail track 16 that is attached to the bottom of the window glass 17. It is also understood that the slide block 14 can move along the inner track of the slide guide rail track 16, while rotated about the shaft of the slide block attachment rivet 15.

The slide block 14 can move along the length of the track of the slide guide rail 16 without leaving the track for the reason of being guided by the overlapping edges 22 of the guide rail. The length of the slide guide rail track 16 prevents the slide block 14 from leaving the track at ether ends. Further, the slide block 14 creates positive connection between the window regulator assembly 10 and the slide guide rail track 16 at the bottom of the window glass 17.

Figure 3:
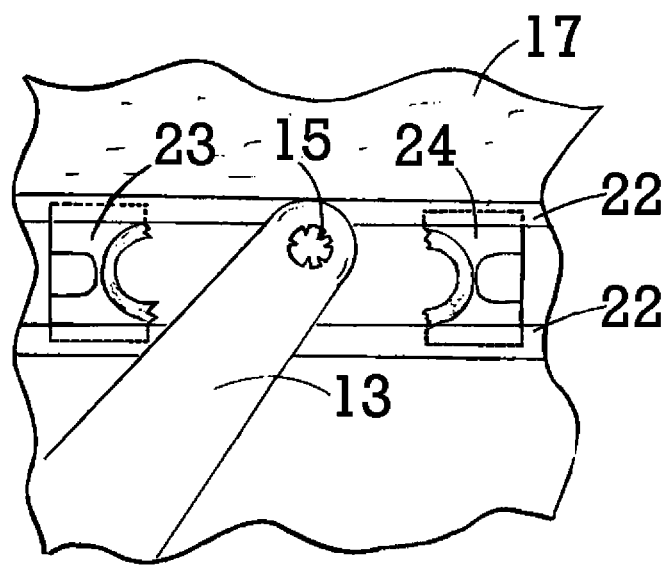
FIG. 3 is a picture of a front plain partial view of window regulator with the linkage arm with the damaged slide block according with the prior art.

FIG. 3 illustrates front plain partial view of the of window regulator 10, containing linkage arm 13, damaged slide block 14 that is split into two damaged sections 23 and 24, slide block attachment rivet 15, and the slide block guide rail track 16. In this embodiment, the slide block 14, is split by the pressure from the shaft of the mounting pin with the rivet head 15 of the linkage arm 13 of the window regulator assembly 10 causing failure of the window regulator 10. As described herein, this condition is possible through normal wear-and-tear, or through an accident, for the slide block 14 to become damaged. In those instances, a linkage arm 13 of the window regulator will no longer relate to the window glass and will not be able to move or to secure the window in desired position.

In this event, a new replacement slide block can be used to replace the damaged one to provide the same functionality. Further, the replacement slide block can be manufactured in stronger material and different designs and still provide the same functionality. Further, the new replacement slide block can be offered in the form of a repair kit.

Figure 4:
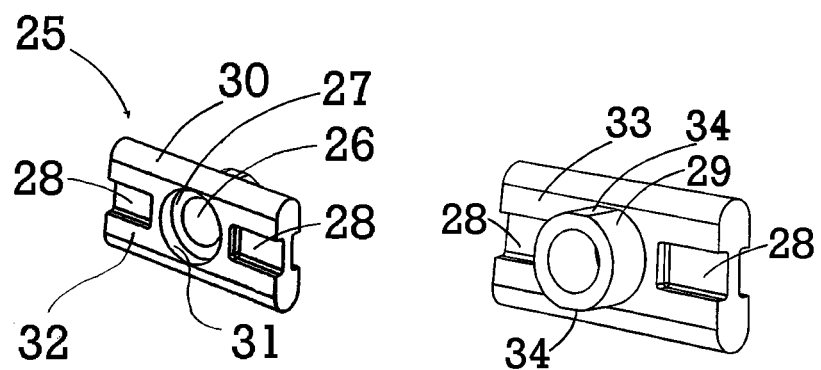
FIG. 4 is a picture of a perspective view of both sides of a replacement slide block for a window regulator prior to installation according to one embodiment of the present invention.

FIG. 4 illustrates a perspective view of both sides of a replacement slide block 25. The slide block may be elongated, having a length longer than the width. The long sides may include half-round profiles 30.

The distance between the edges of the half round profiles 30 may be less than the inside height of the slide guide rail track 16.

The distance between the front side 32 of the slide block 25 and the back side 33 may be less than the inside width of the slide guide rail track 16.

The front side 32 of the slide block 25 and the back side 33 of the slide block 25 may include two pocket 28 at either short end.

The depth of the pockets 28 may be less than one third of the distance between the front and back sides of the slide block 25.

The length of the pockets 28 may be less than one fourth of the distance between the short edges of the slide block 25.

The width of the pockets 28 may be less than one half of the distance between the long edges of the slide block 25.

The back side 33 of the slide block 25 may include cylindrical section 29 that is shorter than the length of cylindrical section 37 of the mounting bolt 35.

The cylindrical section 29 may include two flat section 34 that are parallel to each other.

The distance between the flat sections 34 may be less than the distance between the overlapping edges 22 of the slide guide rail track 16.

The flat sections 34 may be parallel to the long sides of the profiles 30 of the slide block 25.

The cylindrical section 29 may be placed in the relative center of the back side 33 of the slide block 25.

The cylindrical section 29 may include the aperture 26 located in the center. The diameter of the aperture 26 may be larger than the diameter of the cylindrical portion 37 of the mounting bolt 35.

The front side 32 of the slide block 25 may include counterbore to enlarge the aperture 26. The diameter of the counterbore 31 may be larger than the diameter of the shoulder portion 36 of the mounting bolt 35. The depth of the counterbore 31 may be deeper than the height of the shoulder portion 36 of the mounting bolt 35. The distance between front side 32 of the slide block 25 and the bottom edge 27 of the counterbore 31 may be less than one half of the thickness of the slide block 25.

Figure 5:
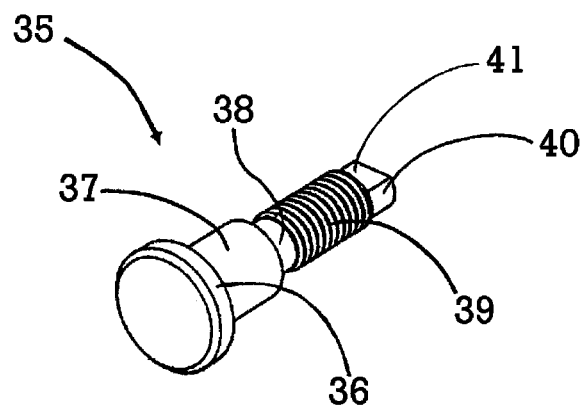
FIG. 5 is a picture of a perspective view of a mounting bolt for the replacement slide block for a window regulator prior to installation according to one embodiment of the present invention.

FIG. 5 Illustrates a perspective view of the mounting bolt 35. The bolt may be elongated, having a length longer than the width. The bolt may include a shoulder portion 36 that is smaller in diameter than the diameter of the counterbore 31 of the slide block 25.

The shoulder section 36 may serve as a stop, when the bolt 35 is inserted into the aperture 26 of the slide block 25. The shoulder section 36 may rest against the bottom of the counterbore 31 of the slide block 25. The length of the shoulder section 36 may be shorter than the depth of the counterbore 31 of the slide block 25.

The bolt may include a cylindrical section 37, that may be smaller in diameter than the shoulder section 36.

The cylindrical section 37, may be longer than the cylindrical section 29 of the slide block 25.

The cylindrical section 37 may be smaller in diameter than the aperture 26 of the slide block 25.

The cylindrical section 37 may serve as the bearing for the slide block 25 when installed into the aperture 26.

The bolt 35 may include neck section 38 that may be smaller in diameter than the section 37.

The bolt 35 may include the threaded portion 39 which thread diameter may be smaller than diameter of the section 37, and smaller than the size of the rivet hole in linkage arm portion 13 of the window regulator assembly 10 shown in the FIG. 1 illustration.

Figure 6:
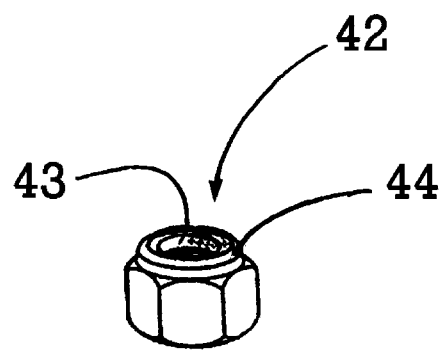
FIG. 6 is a picture of a perspective view of a locking nut for the mounting bolt for the replacement slide block for a window regulator prior to installation according to one embodiment of the present invention.

The length of the threaded portion 39 of the bolt 35 may exceed the total height of the locking nut 42 illustrated in FIG. 6 by at least two times.

The threaded portion 39 is followed by cylindrical section 40 that may be smaller in diameter than the inner diameter of the nylon lock washer in section 43 of the locking nut 42 illustrated in FIG. 6.

The cylindrical section 40 may include two notches 41 formed on its outer periphery. The notches may be placed opposite to each other and serve as a rest point for the retaining devise during the assembly process.

The length of the cylindrical section 40 may be 4 times longer than the crimped section 44 of the locking nut 42 illustrated in FIG. 6.

FIG. 7 illustrates a perspective view of the slide block 25, mounting bolt 35, and the locking nut 42 of the preferred embodiment of the present invention.

FIG. 8 illustrates front plain partial view of the of window regulator containing slide block 25, mounting bolt 35, and the locking nut 42 that are assembled into the window regulator assembly 10, where the mounting bolt 35, is installed the hole of the slide block 25, inserted into the slide block guide rail track 16, protruded through the rivet hole at the end of the linkage arm 13 and secured with the locking nut 42 as outlined in the preferred embodiment of the present invention The method of the present invention includes gaining access to the window regulator within the structure of the vehicle door, by means of the removal of the interior decorative door panel (not shown), leaving the window regulator assembly 10 attached to the door structure, locating access opening within the door frame for the window regulator arm slide block mounting pin rivet head 15, aligning the end of the window regulators linkage arm 13 of the window regulator assembly against the access opening (not shown) by operating window regulator by means of power switch or manually, taking measures to temporarily secure the window glass 17 in the desired position to prevent vertical movement of the same by means of applying adhesive tape to window glass and the door window frame (not shown), locating and grinding off the slide block mounting pin rivet head 15 of slide block mounting pin using suitable tool, removing remaining portion of the mounting shaft pin (not shown) from the window regulators linkage arm 13, exposing and preparing using suitable tools an existing hole to accept a threaded portion 39 of the replacement bolt 35. Preparing the replacement slide block 25 for installation by inserting lubricated replacement bolt 35 into a hole on the front side 32 of the slide block 25. Locating the end of the slide block guide rail 16 within the door structure. Installing lubricated replacement block 25 by sliding it into the guide rail track 16 while keeping the cylindrical shoulder portion 36 of the mounting bolt 35 even with the surface 32 of the slide block 25 and facing the back of the guide rail track 16, aligning the threaded portion 39 of the slide block mounting bolt 35 against the exposed prepared hole of the window regulators linkage arm 13 by operating the window regulator assembly or moving the slide block accordingly, protruding the threaded portion 39 of the mounting bolt 35 through the mounting hole of the regulators linkage arm 13. Installing the locking nut 42 onto cylindrical section 40 of the mounting bolt 35. Rotating the nut 42 by hand to engage with the threaded portion 39 all the way until resistance of the nylon lock washer in section 43 is observed. Attaching suitable tool against exposed sections 41 of the mounting bolt 35. Driving the nut 42 with suitable tool to make tight connection. removing adhesive tape used to secure the window glass in the desired position to allow vertical movement of the glass within the frame; testing for functionality by operating window regulator manually or by power switch as equipped; installing the door decorative panel in its place.

Other methods of repairing damaged or, updating functional non-damaged window regulator assembly 10 with the replacement slide block kit include: removing the window regulator from the door structure, use manually or power operated tools and equipment or any other means to securely repair window regulators with repair kit provided. Further, in replacing the window regulators slide block, the present invention also contemplates replacing some or all the window regulator components, if there has been damage observed.

Now with the use of the replacement slide block kit, the functionality of the window regulator assembly 10 has been restored at a significant savings to the vehicle owner.

Although the present invention has been described in considerable detail with reference to certain preferred versions thereof, other versions are possible. Therefore, the spirit and scope of the appended claims should not be limited to the description of the preferred embodiment described herein.

What is claimed is:

1. A method for replacing a damaged slide block of a window regulator assembly of a door of a vehicle without removing a window regulator arm and a slide guide rail track of the window regulator assembly from the door of the vehicle, the method comprising the steps of:
    removing an interior decorative door panel of the door;
    locating an access opening within a door frame of the door for accessing a window regulator arm slide block connection swivel point;
    aligning the window regulator arm slide block connection swivel point with the access opening by operating a window regulator of the window regulator assembly;
    securing a window glass of the door in a predetermined position to prevent vertical movement of the window glass;
    locating and grinding off a riveted head of an existing slide block mounting pin;
    removing a remaining portion of the existing slide block mounting pin;
    exposing a mounting hole of the window regulator arm for a replacement bolt;
    assembling a replacement slide block by inserting the replacement bolt into the replacement slide block;
    installing the replacement slide block into the slide guide rail track at a bottom of the window glass;

aligning the replacement bolt with the exposed mounting hole of the window regulator arm;

inserting the replacement bolt through the mounting hole of the window regulator arm;

placing a lock nut onto a non-threaded portion of the replacement bolt;

tightening the lock nut;

allowing the vertical movement of the window glass; and installing the interior decorative door panel onto the door.

2. The method of claim 1 further comprising, before the step of removing the interior decorative door panel of the door, unpacking a repair kit containing the replacement slide block, the replacement bolt, and the lock nut.

3. The method of claim 1, wherein the replacement slide block is made of a brass material.

4. The method of claim 1, wherein the replacement bolt is made of a steel material.

5. The method of claim 1, wherein the lock nut is made of a steel material; and wherein the lock nut includes a nylon lock washer.

6. The method of claim 1, wherein the vehicle is a van built in years from 1995 to 2006.

7. The method of claim 1, wherein the step of securing the window glass of the door in the predetermined position is by applying an adhesive tape connecting the window glass to the door frame.

8. The method of claim 1, wherein the replacement slide block comprises
a top half-round profile; and
a bottom half-round profile.

9. The method of claim 8, wherein a distance between an edge of the top half-round profile and an edge of the bottom half-round profile is less than an inside height of the slide guide rail track.

10. The method of claim 8, wherein the replacement slide block further comprises
a first pocket on a front side of the replacement slide block;
a second pocket on the front side of the replacement slide block;
a third pocket on a back side of the replacement slide block; and
a fourth pocket on the back side of the replacement slide block.

11. A method comprising the steps of:
removing an interior decorative door panel of a door of a vehicle;
locating an access opening within a door frame of the door for accessing a window regulator arm slide block connection swivel point;
aligning the window regulator arm slide block connection swivel point with the access opening by operating a window regulator of a window regulator assembly;
securing a window glass of the door in a predetermined position to prevent vertical movement of the window glass;
locating and grinding off a riveted head of an existing slide block mounting pin;
removing a remaining portion of the existing slide block mounting pin and an existing slide block;
exposing a mounting hole of a window regulator arm for a replacement bolt;
assembling a replacement slide block by inserting the replacement bolt into the replacement slide block;
installing the replacement slide block into a slide guide rail track at a bottom of the window glass;
aligning the replacement bolt with the exposed mounting hole of the window regulator arm;
inserting the replacement bolt through the mounting hole of the window regulator arm;
placing a lock nut onto a non-threaded portion of the replacement bolt;
tightening the lock nut;
allowing the vertical movement of the window glass; and
installing the interior decorative door panel onto the door;
wherein a remaining portion, other than the existing slide block mounting pin and the existing slide block, of the window regulator assembly is not removed from the door of the vehicle.

12. The method of claim 11 further comprising, before the step of removing the interior decorative door panel of the door, unpacking a repair kit containing the replacement slide block, the replacement bolt, and the lock nut.

13. The method of claim 11, wherein the replacement slide block is made of a brass material.

14. The method of claim 11, wherein the replacement bolt is made of a steel material.

15. The method of claim 11, wherein the lock nut is made of a steel material; and wherein the lock nut includes a nylon lock washer.

16. The method of claim 11, wherein the step of securing the window glass of the door in the predetermined position is by applying an adhesive tape connecting the window glass to the door frame.

17. A method comprising the steps of:
removing an interior decorative door panel of a door of a vehicle;
locating an access opening within a door frame of the door for accessing a window regulator arm slide block connection swivel point;
aligning the window regulator arm slide block connection swivel point with the access opening by operating a window regulator of a window regulator assembly;
securing a window glass of the door in a predetermined position to prevent vertical movement of the window glass;
locating and grinding off a riveted head of an existing slide block mounting pin;
removing a remaining portion of the existing slide block mounting pin and an existing slide block;
exposing a mounting hole of a window regulator arm for a replacement bolt;
assembling a replacement slide block by inserting the replacement bolt into the replacement slide block;
installing the replacement slide block into a slide guide rail track at a bottom of the window glass;
aligning the replacement bolt with the exposed mounting hole of the window regulator arm;
inserting the replacement bolt through the mounting hole of the window regulator arm;
placing a lock nut onto a non-threaded portion of the replacement bolt;
tightening the lock nut;
allowing the vertical movement of the window glass; and
installing the interior decorative door panel onto the door.

18. The method of claim 17, wherein the lock nut is made of a steel material; and wherein the lock nut includes a nylon lock washer.

19. The method of claim 17, wherein the step of assembling the replacement slide block by inserting the replacement bolt into the replacement slide block is before the step of installing the replacement slide block into the slide guide rail track at the bottom of the window glass.

\* \* \* \* \*